United States Patent
Podgorski et al.

(10) Patent No.: US 10,328,604 B2
(45) Date of Patent: Jun. 25, 2019

(54) METHOD FOR MANUFACTURING A REFRACTORY PART MADE OF COMPOSITE MATERIAL

(71) Applicants: SAFRAN AIRCRAFT ENGINES, Paris (FR); SAFRAN, Paris (FR)

(72) Inventors: Michael Podgorski, Moissy-Cramayel (FR); Catherine Billotte Cabre, La Prairie (CA); Bruno Jacques Gérard Dambrine, Moissy-Cramayel (FR); Ludovic Edmond Camille Molliex, Brunoy (FR); Edu Ruiz, Montreal (CA); Sylvain Turenne, Saint-Bruno (CA)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 10 days.

(21) Appl. No.: 15/538,783

(22) PCT Filed: Dec. 18, 2015

(86) PCT No.: PCT/FR2015/053618
§ 371 (c)(1),
(2) Date: Jun. 22, 2017

(87) PCT Pub. No.: WO2016/102837
PCT Pub. Date: Jun. 30, 2016

(65) Prior Publication Data
US 2017/0341263 A1    Nov. 30, 2017

(30) Foreign Application Priority Data

Dec. 23, 2014  (FR) ..................... 14 63281

(51) Int. Cl.
*B28B 23/02*    (2006.01)
*B28B 1/26*    (2006.01)
(Continued)

(52) U.S. Cl.
CPC ............. *B28B 1/265* (2013.01); *B28B 3/003* (2013.01); *B28B 7/368* (2013.01); *B28B 23/02* (2013.01);
(Continued)

(58) Field of Classification Search
CPC ............................... B28B 1/265; C04B 35/18
(Continued)

(56) References Cited

U.S. PATENT DOCUMENTS 4,568,594 A  *  2/1986  Hordonneau ......... C04B 35/117
                                                        427/376.1
5,436,042 A     7/1995  Lau et al.
(Continued)

FOREIGN PATENT DOCUMENTS

| EP | 2 181 974 A1 | 5/2010 |
|---|---|---|
| FR | 2 702 475 A1 | 9/1994 |
| FR | 2 958 933 A1 | 10/2011 |

OTHER PUBLICATIONS

"Porex PTFE Membranes." Available Oct. 29, 2014. Retrieved Jul. 18, 2018. <http://www.interstatesp.com/materials/porex/ptfe-membranes/> (Year: 2014).*

(Continued)

*Primary Examiner* — Matthew J Daniels
*Assistant Examiner* — Hana C Page
(74) *Attorney, Agent, or Firm* — Pillsbury Winthrop Shaw Pittman LLP

(57) ABSTRACT

A method of fabricating a part out of composite material, includes forming a fiber texture from refractory fibers; placing the texture in a mold having an impregnation chamber including in its bottom portion a part made of porous material, the impregnation chamber being closed in its top portion by a deformable impermeable diaphragm separating the impregnation chamber from a compacting (Continued)

chamber; injecting a slip containing a powder of refractory particles into the impregnation chamber; injecting a compression fluid into the compacting chamber, to force the slip to pass through the texture; draining the liquid of the slip via the porous material part, while retaining the powder of refractory particles inside the texture so as to obtain a fiber preform filled with refractory particles; drying the fiber preform; unmolding the preform; and sintering the refractory particles present in the preform in order to form a refractory matrix in the preform.

8 Claims, 2 Drawing Sheets

(51) Int. Cl.
| | |
|---|---|
| *B28B 3/00* | (2006.01) |
| *B28B 7/36* | (2006.01) |
| *F01D 5/28* | (2006.01) |
| *B29C 70/02* | (2006.01) |
| *B29C 70/44* | (2006.01) |
| *C04B 35/14* | (2006.01) |
| *C04B 35/18* | (2006.01) |
| *C04B 35/58* | (2006.01) |
| *C04B 35/64* | (2006.01) |
| *C04B 35/80* | (2006.01) |
| *C04B 35/117* | (2006.01) |
| *C04B 35/185* | (2006.01) |
| *C04B 35/447* | (2006.01) |
| *C04B 35/565* | (2006.01) |
| *C04B 35/584* | (2006.01) |

(52) U.S. Cl.
CPC .......... *B29C 70/025* (2013.01); *B29C 70/443* (2013.01); *C04B 35/117* (2013.01); *C04B 35/14* (2013.01); *C04B 35/18* (2013.01); *C04B 35/185* (2013.01); *C04B 35/447* (2013.01); *C04B 35/565* (2013.01); *C04B 35/584* (2013.01); *C04B 35/58071* (2013.01); *C04B 35/64* (2013.01); *C04B 35/80* (2013.01); *C04B 35/803* (2013.01); *C04B 35/806* (2013.01); *F01D 5/282* (2013.01); *F01D 5/284* (2013.01); *C04B 2235/3217* (2013.01); *C04B 2235/3244* (2013.01); *C04B 2235/3418* (2013.01); *C04B 2235/3463* (2013.01); *C04B 2235/3804* (2013.01); *C04B 2235/3817* (2013.01); *C04B 2235/3852* (2013.01); *C04B 2235/447* (2013.01); *C04B 2235/5224* (2013.01); *C04B 2235/5228* (2013.01); *C04B 2235/5232* (2013.01); *C04B 2235/5244* (2013.01); *C04B 2235/5248* (2013.01); *C04B 2235/5252* (2013.01); *C04B 2235/5256* (2013.01); *C04B 2235/5436* (2013.01); *C04B 2235/5445* (2013.01); *C04B 2235/5463* (2013.01); *C04B 2235/604* (2013.01); *C04B 2235/6022* (2013.01); *C04B 2235/6027* (2013.01); *C04B 2235/616* (2013.01); *F05D 2230/21* (2013.01); *F05D 2230/22* (2013.01); *F05D 2300/6033* (2013.01); *F05D 2300/6034* (2013.01)

(58) Field of Classification Search
USPC ........................................................ 156/242
See application file for complete search history.

(56) References Cited

U.S. PATENT DOCUMENTS

| | | | | |
|---|---|---|---|---|
| 5,489,408 | A * | 2/1996 | Nakano | B28B 3/02 264/624 |
| 6,533,986 | B1 * | 3/2003 | Fosaaen | B28B 3/003 264/314 |
| 8,309,013 | B2 * | 11/2012 | Pasquero | C04B 35/117 264/621 |
| 9,302,946 | B2 * | 4/2016 | Ritti | C04B 35/117 |
| 2012/0217670 | A1 | 8/2012 | Ruiz et al. | |
| 2016/0362822 | A1 * | 12/2016 | Diss | C04B 35/803 |

OTHER PUBLICATIONS

International Search Report as issued in International Patent Application No. PCT/FR2015/053618, dated Mar. 16, 2016.

Chang, C.-H., "Modeling and evaluation of the filling process of vacuum-assisted compression resin transfer molding," Journal of Polymer Engineering, Walter de Gruyter GMBH, vol. 33, No. 3, ISSN:0334-6447, May 2013, pp. 211-219.

* cited by examiner ized. This step of eliminating the solvent is not usually performed when performing an RTM method. This additional step leads to considerably longer times for treating a preform. It can also be necessary to repeat the operation of injecting the slip, and consequently also the operation of eliminating the solvent.

METHOD FOR MANUFACTURING A REFRACTORY PART MADE OF COMPOSITE MATERIAL

CROSS REFERENCE TO RELATED APPLICATIONS

This application is the U.S. National Stage of PCT/FR2015/053618 filed Dec. 18, 2015, which in turn claims priority to French Application No. 1463281, filed Dec. 23, 2014. The contents of both applications are incorporated herein by reference in their entirety.

BACKGROUND OF THE INVENTION

The present invention relates to a method of fabricating a part out of thermostructural composite material, in particular of the oxide/oxide type or of the ceramic matrix composite (CMC) type, i.e. comprising fiber reinforcement made of fibers of refractory material and densified with a matrix that is likewise made of refractory material.

Oxide/oxide composite material parts are generally prepared by taking a plurality of fiber plies made from refractory oxide fibers and draping them in a mold, each ply being previously impregnated with a slip filled with refractory oxide particles. The set of plies as arranged in this way is then compacted using a countermold or a vacuum sheet and passing through an autoclave. The filled preform as obtained in this way is then subjected to sintering in order to form a refractory oxide matrix within the preform and obtain a part made out of oxide/oxide composite material. This technique can also be used for making parts out of ceramic matrix composite (CMC) material. Under such circumstances, the fiber plies are made out of fibers of silicon carbide (SiC) or of carbon and they are impregnated with a slip filled with particles of carbide (e.g. SiC), of boride (e.g. $TiB_2$), or of nitride (e.g. $Si_3N_4$).

Nevertheless, that type of preparation method is suitable only for making CMC or oxide/oxide composite material parts that are of small thickness and that have two-dimensional (2D) fiber reinforcement. The mechanical characteristics of composite materials of those types remain limited in certain directions. In particular, those materials present poor delamination performance and they do not withstand shear forces well.

Fiber textures obtained by three-dimensional weaving between continuous warp and weft yarns enables the mechanical strength of the material to be increased, and in particular enables its ability to withstand delamination to be increased. Under such circumstances, and also for thick 2D fiber textures, it is possible to cause a filled suspension to penetrate into the fiber texture, which may be of thickness that reaches several tens of millimeters, depending on the intended applications, only by means of methods that make use of a pressure gradient, such as infusion type methods, injection molding type methods known as resin transfer molding (RTM), or methods involving suction of submicron powder known as advanced powder solutions (APS).

Nevertheless, in the context of making a part out of CMC or oxide/oxide material, those methods present certain drawbacks.

Specifically, impregnating a fiber texture of complex shape and great thickness cannot be performed using an infusion type method, since it does not enable a pressure gradient to be reached that is sufficient for obtaining good impregnation throughout the texture.

The APS type method does not provide fine control over the quantity of matrix that is introduced into the preform.

Although the RTM method can be used for impregnating a fiber texture with a filled slip, it nevertheless requires performing a step of eliminating the solvent of the slip (by evaporation and discharge) in order to leave only the solid fillers in the preform prior to sintering. This step of eliminating the solvent is not usually performed when performing an RTM method. This additional step leads to considerably longer times for treating a preform. It can also be necessary to repeat the operation of injecting the slip, and consequently also the operation of eliminating the solvent.

Furthermore, evaporating the solvent is difficult, since the solvent needs to be removed from the preform without disturbing the distribution of solid particles (refractory oxide, carbide, boride, nitride, etc.) that have been deposited by the slip. Specifically, while drying the impregnated preform, evaporating and discharging the solvent can lead to particles being entrained with the solvent and/or can modify the distribution of the particles in the preform and can lead to large pores appearing in the final material because of the lack of matrix at certain locations.

OBJECT AND SUMMARY OF THE INVENTION

An object of the present invention is to remedy the above-mentioned drawbacks and to propose a solution that makes it possible to make parts out of composite material, in particular of oxide/oxide type or of CMC type, from a fiber texture that is thick and/or of complex shape, and to do in a manner that is fast and reliable, while giving good control over the deposition and the distribution of solid particles within the fiber texture in order to obtain a material with a very small content of macropores.

To this end, the invention provides a method of fabricating a part out of composite material, the method comprising the following steps:

forming a fiber texture from refractory fibers;

placing the fiber texture in a mold having an impregnation chamber including in its bottom portion a part made of porous material on which a first face of said texture rests, the impregnation chamber being closed in its top portion by a deformable impermeable diaphragm placed facing a second face of the fiber texture, said diaphragm separating the impregnation chamber from a compacting chamber;

injecting a slip containing a powder of refractory particles into the impregnation chamber between the second face of the fiber texture and the diaphragm;

injecting a compression fluid into the compacting chamber, the fluid exerting pressure on the diaphragm to force the slip to pass through the fiber texture;

draining, via the porous material part, the liquid of the slip that has passed through the fiber texture while retaining the powder of refractory particles inside said texture by means of said part of porous material so as to obtain a fiber preform filled with refractory particles;

drying the fiber preform;

unmolding the fiber preform; and sintering the refractory particles present in the fiber preform in order to form a refractory matrix in said preform.

By using a part made of porous material suitable for draining the liquid of the slip, the method of the invention makes it possible to eliminate the liquid phase from the slip that is introduced into the fiber texture without eliminating the refractory solid particles that are also present in the texture. Eliminating the solid phase of the slip by draining also makes it possible to avoid disturbing the distribution of refractory particles within the fiber texture, and consequently to obtain a composite material part with a high volume fraction for the matrix. Consequently, the part made of thermostructural composite material presents improved mechanical properties.

In a first particular aspect of the method of the invention, the porous material part is rigid and presents a shape matching the shape of the composite material part that is to be made.

In a second particular aspect of the method of the invention, the porous material part is deformable and the bottom of the mold presents a shape corresponding to the shape of the composite material part that is to be made, the porous material part taking on the shape of the bottom of the mold.

In a third particular aspect of the method of the invention, during the step of forming the fiber texture, the yarns are woven with a three-dimensional weave.

In a fourth particular aspect of the method of the invention, the fiber texture is made by stacking plies woven using a two-dimensional weave, the texture presenting a thickness of at least 0.5 millimeters (mm) and preferably at least 1 mm.

The yarns of the preform may be formed by fibers made up of one or more of the following materials: alumina, mullite, silica, an aluminosilicate, a borosilicate, silicon carbide, and carbon.

The refractory particles may be made of a material selected from: alumina, mullite, silica, an aluminosilicate, an aluminophosphate, zirconia, a carbide, a boride, and a nitride.

In an embodiment, the composite material part that is obtained constitutes a turbine engine blade.

BRIEF DESCRIPTION OF THE DRAWINGS

Other characteristics and advantages of the invention appear from the following description of particular implementations of the invention given as non-limiting examples, and with reference to the accompanying drawings, in which.

DETAILED DESCRIPTION OF IMPLEMENTATIONS

Figure 1:
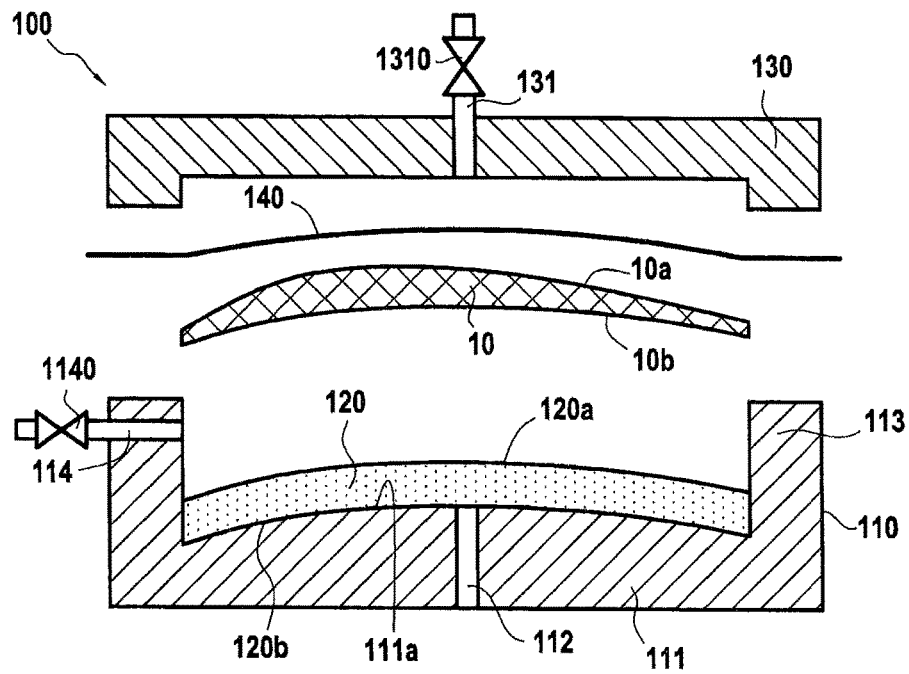
FIG. 1 is a diagrammatic exploded section view of tooling in accordance with an embodiment of the invention.

The method of the present invention for fabricating a part out of composite material, and in particular out of oxide/oxide type or CMC type composite material, begins by making a fiber texture that is to form the reinforcement of the part.

The fiber structure is made in known manner by using a Jacquard type loom to weave a bundle of warp yarns or strands occupying a plurality of layers, with the warp yarns being interlinked by weft yarns, or vice versa. The fiber texture may be made by stacking plies obtained by two-dimensional (2D) weaving. The fiber texture may also be made directly as a single part by three-dimensional (3D) weaving. The term "two-dimensional weaving" is used herein to mean a conventional method of weaving in which each weft yarn passes from one side to the other of yarns in a single layer of warp yarns, or vice versa. The method of the invention is particularly suited to enabling a filled slip to be introduced into 2D fiber textures, textures obtained by stacking 2D plies, and of considerable thickness, e.g. 2D fiber structures having a thickness of at least 0.5 mm, and preferably at least 1 mm.

The term "three-dimensional weaving" or "3D weaving", or indeed "multilayer weaving" is used herein to mean weaving in which at least some of the weft yarns interlink warp yarns in a plurality of layers of warp yarns, or vice versa, by weaving with a weave that may in particular be selected from the following weaves: interlock, multi-plain, multi-satin, and multi-twill.

The term "interlock weave or fabric" is used herein to mean 3D weaving in which each layer of warp yarns interlinks a plurality of layers of weft yarns with all of the yarns in the same warp column having the same movement in the weave plane.

The term "multi-plain weave or fabric" is used herein to mean 3D weaving with a plurality of layers of weft yarns in which the base weave for each layer is equivalent to a weave of conventional plain type, but with certain points of the weave interlinking the layers of weft yarns together.

The term "multi-satin weave or fabric" is used herein to mean 3D weaving with a plurality of layers of weft yarns in which the base weave for each layer is equivalent to a weave of conventional satin type, but with certain points of the weave interlinking layers of weft yarns together.

The term "multi-twill weave or fabric" is used herein to mean 3D weaving with a plurality of layers of weft yarns in which the base weave for each layer is equivalent to a conventional twill type weave, but with certain points of the weave interlinking layers of weft yarns together.

3D textures present complex shape into which it is difficult to introduce solid particles in suspension and to spread them out uniformly. The method of the invention is also very well adapted to introducing a filled slip into 3D woven fiber textures.

The yarns used for weaving the fiber texture that is to form the fiber reinforcement of the composite material part may in particular be made of fibers constituted by any of the following material: alumina, mullite, silica, an aluminosilicate, a borosilicate, silicon carbide, carbon, or a mixture of two or more of these materials.

Figure 2:
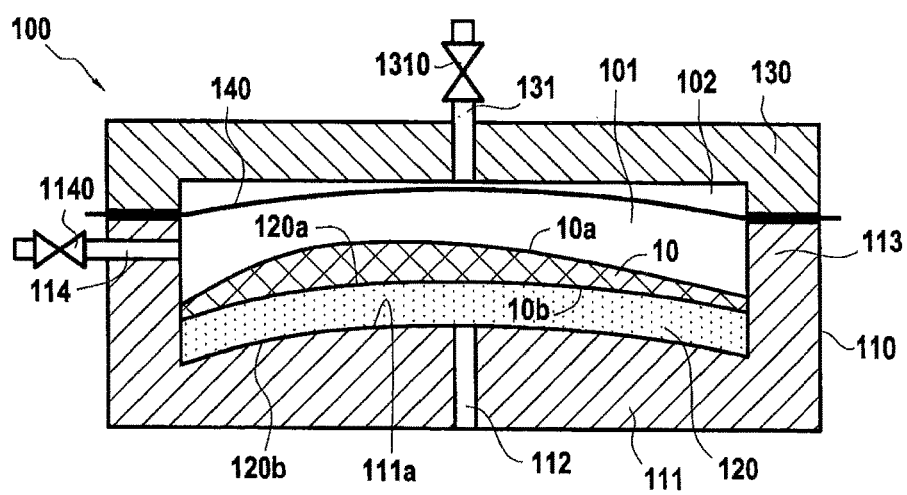
FIG. 2 is a diagrammatic section view showing the FIG. 1 tooling when closed with a fiber texture in position therein.

Once the fiber texture has been made, it is placed in tooling in accordance with the invention making it possible to place refractory particles within the fiber texture, as explained below. For this purpose and as shown in FIGS. 1 and 2, the fiber texture 10 is placed in tooling 100. In the presently-described example, the fiber texture 10 is made using one of the above-defined techniques (stacking 2D plies or 3D weaving) using Nextel 610™ alumina yarns. The fiber texture 10 in this example is for forming the fiber reinforcement of a blade made out of oxide/oxide composite material.

The tooling 100 comprises a mold 110 having a bottom 111 that is provided with a vent 112. The mold 110 also has a side wall 113 having an injection port 114 fitted with a valve 1140. A part 120 made of porous material is placed on the inside surface 111a of the bottom 111. The part made of porous material 120 has a bottom face 120b in contact with the inside surface 111a of the bottom 111 and a top face 120a for receiving the fiber texture 10. In the presently-described example, the part 120 is made with a deformable material, while the inside surface 111a of the bottom 111 of the mold 110 presents a shape or a profile corresponding to the shape of the final part that is to be fabricated, specifically an aeroengine blade in this example. Since the part 120 is deformable, it matches the profile of the inside surface 111*a* of the bottom 111 and presents on its top face 120*a* a shape similar to the shape of the surface 111*a*. By way of example, the part 120 may be made out of microporous polytetrafluoroethylene (PTFE), such as the "microporous PTFE" product sold by the supplier Porex®.

In a variant implementation, the porous material part is rigid and presents a top face of shape corresponding to the shape of the final part that is to be fabricated. Under such circumstances, the part may be made in particular by thermoforming.

By way of example, the porous material part may present thickness of several millimeters and a mean pore fraction of about 30%. The mean pore size (D50) of the part made of porous material may lie in the range 1 micrometer (μm) to 2 μm, for example.

The tooling 100 also includes a lid 130 having an injection port 131 with a valve 131*0* and a deformable diaphragm 140, which diaphragm, once the tooling has been closed (FIG. 2) separates an impregnation chamber 110 in which the fiber texture 10 is present from a compacting chamber 102 situated above the diaphragm 140. The diaphragm 140 may be made of silicone, for example.

Figure 3:
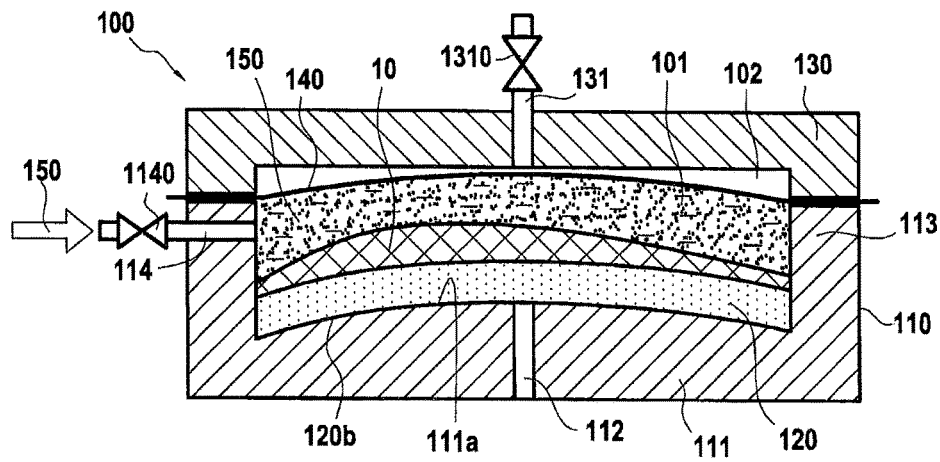
FIGS. 3 and 4 are diagrammatic section views showing the steps of impregnating a fiber texture in the tooling of FIG. 2 with a filled slip, in accordance with an implementation of the method of the invention.
Figure 4:
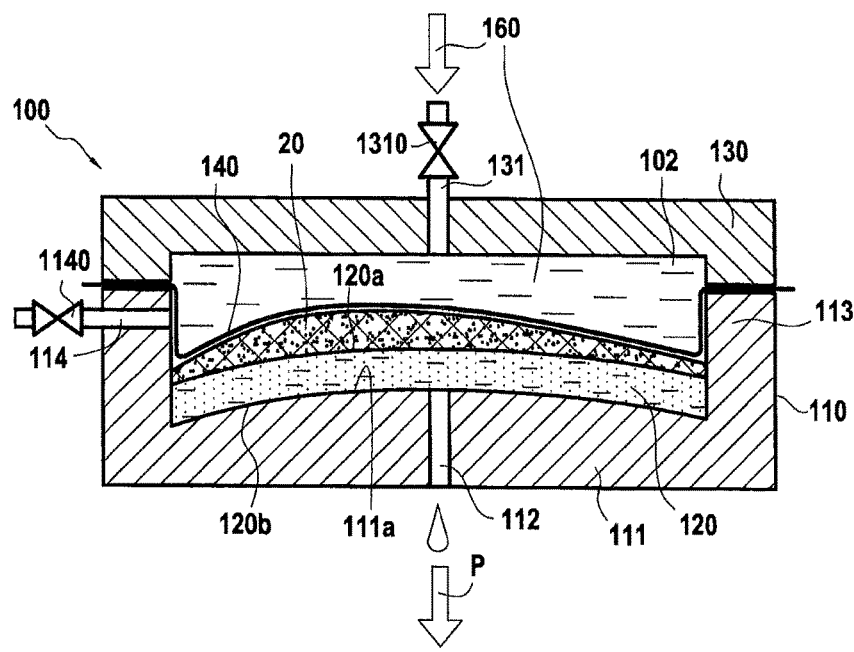

After placing the texture 10 on the top face 120*a* of the porous material part 120*a*, the mold 110 is closed with the lid 130 (FIG. 2). A slip 150 is then injected into the impregnation chamber 101 via the injection port 114 having its valve 114*0* open (FIG. 3). In this example, the slip 150 is for forming a refractory oxide matrix in the texture. The slip 150 corresponds to a suspension containing a powder of refractory oxide particles, the particles presenting a mean particle size lying in the range 0.1 μm to 10 μm. The liquid phase of the slip may in particular be constituted by water (acid pH), ethanol, or any other liquid in which it is possible to put the desired powder into suspension. An organic binder may also be added (e.g. polyvinyl alcohol (PVA) which is soluble in water). The binder serves to ensure that the green preform holds together after drying and before sintering.

By way of example, the slip 150 may correspond to an aqueous suspension constituted by alumina powder having a mean particle size (D50) lying in the range 0.1 μm to 0.3 μm and of volume fraction lying in the range 27% to 42%, the suspension being made acidic using nitric acid (pH in the range 1.5 to 4). In addition to alumina, the refractory oxide particles may equally well be a material selected from mullite, silica, an aluminosilicate, and an aluminophosphate, and zirconia. As a function of their base composition, the refractory oxide particles may also be mixed with particles of alumina, of zirconia, of aluminosilicate, of rare earth oxides, of rare earth disilicates (e.g. used in environmental or thermal barriers), or any other filler suitable for adding specific functions to the final material (carbon black, graphite, silicon carbide, etc.).

The quantity of slip 150 that is injected into the impregnation chamber 101 is determined as a function of the volume of the fiber texture 10 that is to be impregnated. It is the quantity of powder initially introduced that controls the final settling thickness and thus the fiber volume fraction (Fvf) and the matrix volume fraction (Mvf).

Once the slip has been injected into the impregnation chamber 101, the compacting operation is performed by injecting a compression fluid 160, e.g. oil, into the compacting chamber 102 via the injection port 131 having its valve 131*0* open, after the valve 114*0* of the injection port 114 has been closed. The compression fluid 160 applies pressure on the slip 150 through the diaphragm 140, forcing the slip 150 to penetrate into the fiber texture 10. The fluid 160 imposes hydrostatic pressure over the entire diaphragm 160, and consequently on all of the slip present above the texture 10. The pressure applied by the diaphragm 140 on the slip and on the fiber texture is preferably less than 15 bar, e.g. 7 bar, so as to cause the slip to penetrate into the texture and compact the texture sufficiently to enable the liquid phase of the slip to be drained via the porous material part without degrading the resulting preform.

Several functions are performed by the porous material part 120 that is situated beside the face 10*b* of the fiber texture that is opposite from the face 10*a* through which the slip penetrates into the texture. Specifically, the part 120 enables the liquid of the slip to be drained out from the fiber texture, with the liquid as drained in this way being discharged in this example via the vent 112. The draining is performed both during and after the compacting operation. When no more liquid runs out through the vent 112, draining has terminated. In combination with applying a pressure on the slip by means of a compression fluid, it is possible to apply pumping P, e.g. by means of a primary vacuum pump (not shown in FIGS. 1 to 4) via the vent 112. Such pumping is optional. Heating may suffice. Nevertheless, the combination of both of them enables drying to be accelerated.

In addition, the tooling may be provided with heater means, such as resistor elements incorporated in the walls of the tooling, so as to increase the temperature inside the compacting chamber and facilitate exhausting the liquid from the slip by evaporation. The temperature in the compacting chamber may be raised to a temperature lying in the range 80° C. to 105° C.

The porous material part 120 also makes it possible to retain the solid particles of refractory oxide that are present in the slip, with the refractory oxide particles thus becoming deposited progressively by settling in the fiber texture. This makes it possible subsequently (i.e. after sintering) to obtain the matrix.

The part 120 also makes it possible to keep the fiber texture in shape during the compacting operation, since its top face 120*a* reproduces the shape of the bottom 111 of the mold 110 corresponding to the shape of the final part that is to be fabricated.

A fiber preform 20 is thus obtained that is filled with refractory oxide particles, specifically alumina particles of the above-described type. Thereafter, the preform is unmolded by emptying out the compression fluid from the compaction chamber 102, with the preform retaining its compacted shape after unmolding.

The preform is then extracted from the tooling and subjected to sintering heat treatment in air at a temperature lying in the range 1000° C. to 1200° C. in order to sinter the refractory oxide particles together, thereby forming a refractory oxide matrix in the preform. This produces a part made of oxide/oxide composite material that is provided with fiber reinforcement obtained by 3D weaving that presents a high matrix volume fraction with a uniform distribution of the matrix throughout the fiber reinforcement.

A CMC composite material part can be obtained in the same manner by making a fiber texture with silicon carbide fibers or carbon fibers and using a slip filled with carbide particles (e.g. SiC), boride particles (e.g. $TiB_2$), or nitride particles (e.g. $Si_3N_4$).

The invention claimed is:
1. A method of fabricating a part out of composite material, the method comprising:
   forming a fiber texture from refractory fibers;

placing the fiber texture in a mold having an impregnation chamber including in its bottom portion a part made of porous material on which a first face of said texture rests, the impregnation chamber being closed in its top portion by a deformable impermeable diaphragm placed facing a second face of the fiber texture, said diaphragm separating the impregnation chamber from a compacting chamber;

injecting a slip containing a powder of refractory particles into the impregnation chamber between the second face of the fiber texture and the diaphragm; injecting a compression fluid into the compacting chamber, the fluid exerting pressure on the diaphragm to force the slip to pass through the fiber texture; draining, via the porous material part, the liquid of the slip that has passed through the fiber texture while retaining the powder of refractory particles inside said texture by means of said part of porous material so as to obtain a fiber preform filled with refractory particles;

drying the fiber preform;

unmolding the fiber preform; and sintering the refractory particles present in the fiber preform in order to form a refractory matrix in said preform.

2. A method according to claim 1, wherein the porous material part is rigid and presents a shape matching the shape of the composite material part that is to be made.

3. A method according to claim 1, wherein the porous material part is deformable, and the bottom of the mold presents a shape corresponding to the shape of the composite material part that is to be made, the porous material part taking on the shape of the bottom of the mold.

4. A method according to claim 1, wherein, during the step of forming the fiber texture, the yarns are woven with a three-dimensional weave.

5. A method according to claim 1, wherein the fiber texture is made by stacking plies woven using a two-dimensional weave, the texture presenting a thickness of at least 0.5 mm.

6. A method according to claim 1, wherein the yarns of the preform are formed by fibers made up of one or more of the following materials: alumina, mullite, silica, an aluminosilicate, a borosilicate, silicon carbide, and carbon.

7. A method according to claim 5, wherein the refractory particles are made of a material selected from: alumina, mullite, silica, an aluminosilicate, an aluminophosphate, zirconia, a carbide, a boride, and a nitride.

8. A method according to claim 1, wherein the composite material part that is obtained constitutes a turbine engine blade.

* * * * *